(12) United States Patent
Moulder et al.

(10) Patent No.: US 10,353,067 B2
(45) Date of Patent: Jul. 16, 2019

(54) METHODS AND SYSTEMS FOR NEAR-FIELD MICROWAVE IMAGING

(71) Applicant: MASSACHUSETTS INSTITUTE OF TECHNOLOGY, Cambridge, MA (US)

(72) Inventors: William F. Moulder, Nashua, NH (US); James D. Krieger, Cambridge, MA (US); Denise T. Maurais-Galejs, Carlisle, MA (US); Huy Nguyen, Burlington, MA (US); Jeffrey S. Herd, Rowley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 177 days.

(21) Appl. No.: 15/262,687

(22) Filed: Sep. 12, 2016

(65) Prior Publication Data

US 2017/0227636 A1    Aug. 10, 2017

Related U.S. Application Data

(60) Provisional application No. 62/268,559, filed on Dec. 17, 2015.

(51) Int. Cl.
*G01S 13/89* (2006.01)
*G01V 3/12* (2006.01)
(Continued)

(52) U.S. Cl.
CPC ............ *G01S 13/89* (2013.01); *G01S 13/003* (2013.01); *G01S 13/867* (2013.01); *G01S 13/887* (2013.01); *G01V 3/12* (2013.01)

(58) Field of Classification Search
CPC ...... G01S 13/003; G01S 13/006; G01S 13/89; G01S 13/9094; G01S 13/867; G01S 13/9011; G01S 7/418; G06T 17/00; G01V 3/12

See application file for complete search history.

(56) References Cited

U.S. PATENT DOCUMENTS 9,029,778 B1 *   5/2015   Boyd ................. G01J 3/42
                                                250/341.1
2009/0040099 A1 *  2/2009  Young ............... G01S 7/4026
                                                342/179

(Continued)

OTHER PUBLICATIONS

International Search Report and Written Opinion of the International Searching Authority in regards to International Application No. PCT/U16/51250, dated May 18, 2017, 14 pages.

(Continued)

*Primary Examiner* — Vladimir Magloire
*Assistant Examiner* — Daniel P Malley, Sr.
(74) *Attorney, Agent, or Firm* — Smith Baluch LLP

(57) ABSTRACT

A multistatic array topology and image reconstruction process for fast 3D near field microwave imaging are presented. Together, the techniques allow for hardware efficient realization of an electrically large aperture and video-rate image reconstruction. The array topology samples the scene on a regular grid of phase centers, using a tiling of multistatic arrays. Following a multistatic-to-monostatic correction, the sampled data can then be processed with the well-known and highly efficient monostatic Fast Fourier Transform (FFT) imaging algorithm. In this work, the approach is described and validated experimentally with the formation of high quality microwave images. The scheme is more than two orders of magnitude more computationally efficient than the backprojection method. In fact, it is so efficient that a cluster of four commercial off-the-shelf (COTS) graphical processing units (GPUs) can render a 3D image of a human-sized scene in 0.048-0.101 seconds.

23 Claims, 11 Drawing Sheets

(51) Int. Cl.
*G01S 13/00* (2006.01)
*G01S 13/86* (2006.01)
*G01S 13/88* (2006.01)

(56) References Cited

U.S. PATENT DOCUMENTS

| | | | |
|---|---|---|---|
| 2009/0271146 A1 | 10/2009 | Ammar et al. | |
| 2011/0267221 A1 | 11/2011 | Brundick et al. | |
| 2012/0249730 A1* | 10/2012 | Lee | G06T 17/00 348/38 |
| 2013/0082858 A1 | 4/2013 | Chambers et al. | |
| 2013/0082859 A1 | 4/2013 | Paglieroni et al. | |
| 2013/0082870 A1* | 4/2013 | Chambers | G01S 13/90 342/25 A |
| 2013/0120181 A1 | 5/2013 | Hallquist et al. | |
| 2013/0162475 A1* | 6/2013 | Blech | H01Q 21/08 342/368 |
| 2014/0055297 A1 | 2/2014 | Beeri et al. | |
| 2014/0091965 A1* | 4/2014 | Sheen | G01S 13/90 342/25 A |
| 2014/0161063 A1* | 6/2014 | Yeh | H04W 72/042 370/329 |
| 2017/0054221 A1* | 2/2017 | West | H01Q 21/065 |

OTHER PUBLICATIONS

Ahmed et al, "Advanced Micowave Imaging," IEEE Microwave Magazine, pp. 26-43, Sep./Oct. 2012.

Ahmed et al., "Fully Electronic E-Band Personnel Imager of $2m^2$ Aperture Based on a Multistatic Architecture," IEEE Transactions on Microwave Theory and Techniques, vol. 61, No. 1, pp. 651-657, Jan. 2013.

Alvarez et al., "Fourier-Based Imaging for Multistatic Radar Systems," IEEE Transactions on Microwave Theory and Techniques, vol. 62, No. 8, pp. 1798-1810, Aug. 2014.

Arakawa, M., "Computational Workloads for Commonly Used Signal Processing Kernels," Massachusetts Institute of Technology, Lincoln Laboratory, 88 pages, Nov. 30, 2006.

Fear et al., "Confocal microwave imaging for breast cancer detection: Localization of tumors in three dimensions," IEEE Transactions on Biomedical Engineering, vol. 49, No. 8, pp. 812-822, 2002.

Ghasr et al., "Portable real-time microwave camera at 24 ghz," IEEE Transactions on Antennas and Propagation, vol. 60, No. 2, pp. 1114-1125, 2012.

Gonzales-Valdes et al., "On-the-move active millimeter wave interrogation system using a hallway of multiple transmitters and receivers," 2014, pp. 1107-1108.

Kozick et al., "Synthetic aperture pulse-echo imaging with rectangular boundary arrays," IEEE Transactions on Image Processing, vol. 2, No. 1, pp. 68-79, 1993.

Sheen et al., "Three-dimensional millimeter-wave imaging for concealed weapon detection," IEEE Transactions on Microwave Theory and Techniques, vol. 49, No. 9, pp. 1581-1592, 2001.

Sheen, David M., et al., "Reconstruction techniques for sparse multi-static linear array microwave imaging," in Passive and Active Millimeter-Wave Imaging XVII, edited by David A. Wikner and Arttu R. Luukanen, Proc. of SPIE vol. 9078, 2014, 12 pages.

* cited by examiner

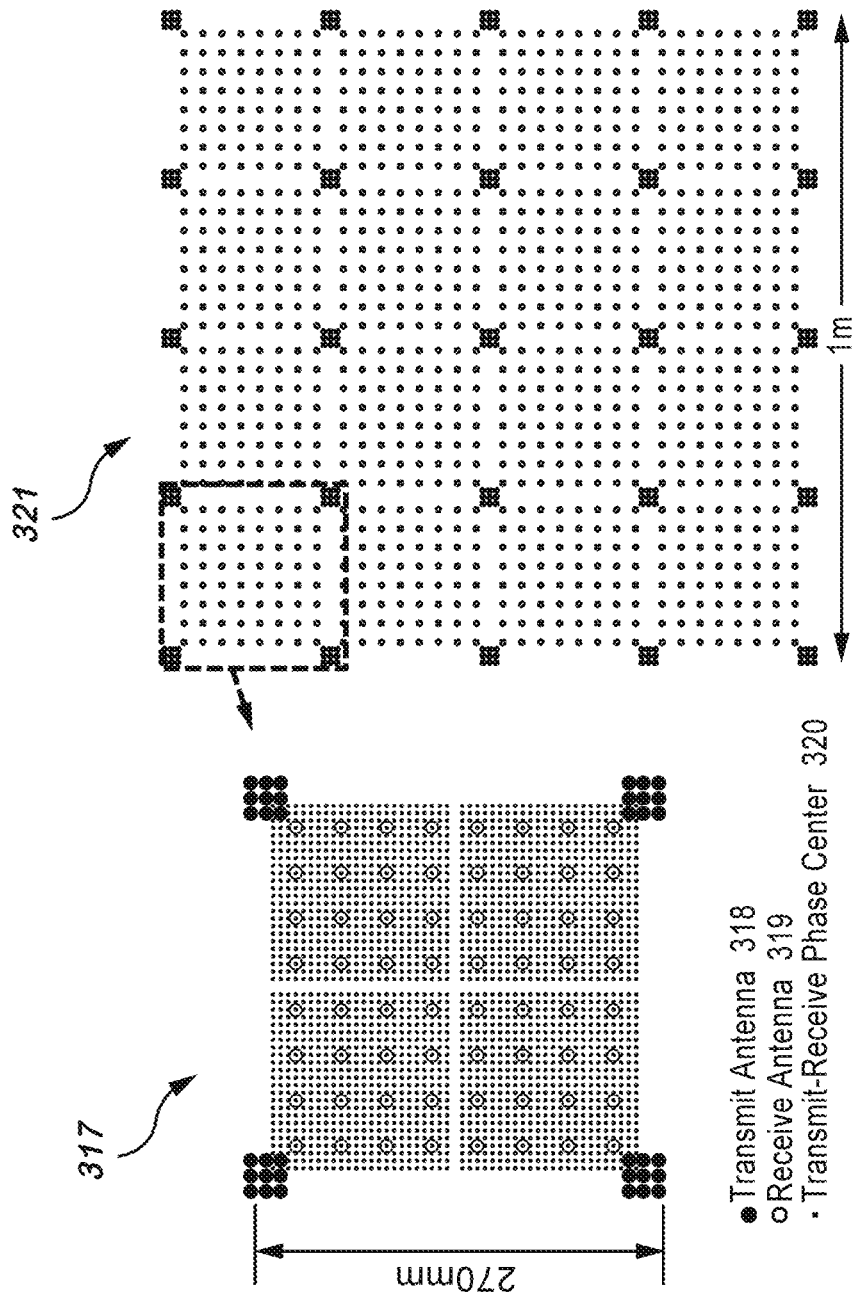

ered herein by reference. -->

METHODS AND SYSTEMS FOR NEAR-FIELD MICROWAVE IMAGING

CROSS-REFERENCE TO RELATED PATENT APPLICATIONS

This application claims priority, under 35 U.S.C. § 119(e), from U.S. Application No. 62/268,559, filed Dec. 17, 2015, and titled "Multistatic Array Topology for FFT-Based Field Imaging," the entire contents of which is incorporated herein by reference.

GOVERNMENT SUPPORT

This invention was made with government support under Contract No. FA8721-05-C-0002 awarded by the U.S. Air Force. The government has certain rights in the invention.

BACKGROUND

Near-field microwave imaging is a non-ionizing and cost effective sensing modality for variety of applications, including Non-Destructive Evaluation (NDE), medical diagnostics, and detection of concealed weapons. In the latter application, a need exists for a practical system that can image subjects in high foot traffic environments, such as mass transit systems, stadiums, and large public events. In order to handle a potentially constant stream of subjects in motion, the system should measure a subject very quickly (on the order of tens of milliseconds), and reconstruct microwave images of a subject at video rate (e.g., 10 or more frames per second).

The desires to measure subject quickly and reconstruct microwave images at video rates present two major challenges. The first challenge is a cost-effective realization of an electrically large antenna array. Fast acquisition implies that the system should be fully electronic (e.g., it should sample the scene without moving sensors). Furthermore, for proper near-field illumination of a human subject, the array should be roughly the size of the subject (e.g., 1-2 m). For a high resolution system operating in the tens of GHz, this implies an aperture size in excess of 100$\lambda$.

A well-known paradigm that mitigates this challenge is multistatic sampling. Such array topologies use transmitters and receivers that are not co-located, and are not separated by a fixed distance. This allows an array with $N_T$ transmit elements and $N_R$ receive elements to form $N_T N_R$ spatially diverse samples. This is in contrast to a monostatic sampling scheme (wherein transmitters and receivers are co-located), which uses $N_T N_R$ transmit-receive elements to achieve the same sampling.

The second challenge is video rate three-dimensional (3D) microwave image formation. The backprojection algorithm can be used with any multistatic configuration, but its computational demands are extreme. Fast Fourier Transform (FFT) imaging has long been used to efficiently construct images sampled with monostatic sampling schemes; however, this formulation cannot be used directly with multistatic sampled data. The modified FFT imaging formulation for multistatic arrays presented in Y. Alvarez et al., "Fourier-based imaging for multistatic radar systems," *IEEE Transactions on Microwave Theory and Techniques*, vol. 62, no. 8, pp. 1798-1810, 2014, provides a tremendous improvement over backprojection, but is formulated for topologies where a single transmitter and multiple receivers are used. For topologies with multiple transmitters and receivers, the scheme can be run multiple times, at the expense of processing overhead.

SUMMARY

The apparatus and methods presented herein include a sparse antenna array topology and a multistatic array sampling scheme that allows use of FFT-based imaging after the data undergoes a correction. The array topology allows multistatic sampling to be employed (reducing element count) in conjunction with FFT imaging (reducing processing load). This technology allows for high quality image reconstruction of a scene roughly the size of a human subject at video rate on cost-effective commercial off-the-shelf (COTS) hardware.

Embodiments of the present technology include systems and methods for near-field microwave imaging of an image plane. An example system includes a multistatic array, a transceiver operably coupled to the multistatic array, and a processor operably coupled to the transceiver. In operation, the multistatic array acquires multistatic array data, and the transceiver transduces the multistatic array data. The processor applies a multistatic-to-monostatic correction to the multistatic array data to form corrected multistatic array data, Fourier transforms the corrected multistatic array data to form Fourier-domain data, and applies a phase shift to the Fourier-domain data to form phase-shifted Fourier-domain data. The phase shift corresponds to a distance between the multistatic array and the image plane. (The multistatic image data may optionally be interpolated onto a uniform grid before being Fourier transformed.) Then the processor inverse Fourier transforms the phase-shifted Fourier-domain data to form a representation of the image plane. The system may perform these steps at a rate of 5 Hz, 10 Hz, or faster.

In some cases, the multistatic array comprises a plurality of tiled multistatic arrays. In these cases, each transmitter-receiver pair in each tiled multistatic array in the plurality of tiled multistatic arrays is sampled to yield the multistatic array data. Sampling each transmitter-receiver pair in each tiled multistatic array may comprises sampling only each transmitter-receiver pair in each tiled multistatic array in the plurality of tiled multistatic arrays. For instance, a tiled multistatic array may include a linear transmit array configured to communicate only with adjacent linear receive arrays. These tiled multistatic arrays may operate by emitting and receiving orthogonal waveforms (e.g., with a first tiled multistatic array emitting and receiving a first waveform, a second tiled multistatic array emitting and receiving a second waveform orthogonal to the first waveform, and so on).

The multistatic array data can be acquired by sampling a grid of phase centers defined by a plurality of transmitter-receiver pairs in the multistatic array. This grid of phase centers can be a nonredundant, regularly spaced grid of equivalent phase centers.

The multistatic-to-monostatic correction can be applied by estimating multistatic reflections of a point scatterer as sampled by the multistatic array, estimating monostatic reflections of the point scatterer as sampled in a plane of the multistatic array, and weighting the multistatic array data by a ratio of the monostatic reflections of the point scatterer to the multistatic reflections of the point scatterer. The point scatterer may be at an approximate center of the image plane.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A-3E illustrate tiled multistatic array topologies suitable for use with the imaging systems of FIGS. 1 and 2.

DETAILED DESCRIPTION

The antenna array topologies disclosed herein are (1) highly sparse, allowing for hardware efficient implementation, and (2) compatible with a computationally efficient image reconstruction process. While some existing imaging systems use sparse arrays, the sampling scheme presented here is unique in that it is readily compatible with FFT imaging. This translates to a lower computational cost for image formation, which makes it suitable for performing near field microwave/millimeter wave imaging at video rates for security, non-destructive testing, and medical applications.

An inventive antenna array can be sparse (e.g., with a small fraction of the number of elements in a conventional antenna array), so it can be large (e.g., with an aperture of >100λ) without being expensive. Such a system can capture image data in less than 50 ms at a maximum range of about 3 meters. The captured data is conditioned with a correction, which makes the data more closely approximate data captured by a monostatic aperture of equivalent size. While the correction has limited spatial domain, generally a human-sized domain can be imaged with a single correction of the data. The corrected data is then processed via monostatic Fast Fourier Transform (FFT) imaging, a technique with unparalleled computational efficiency. Thanks in part to this computational efficiency, the captured data can be used to generate microwave or millimeter-wave images at a rate of 10 Hz or greater, with cost-effective computing hardware.

Figure 1:
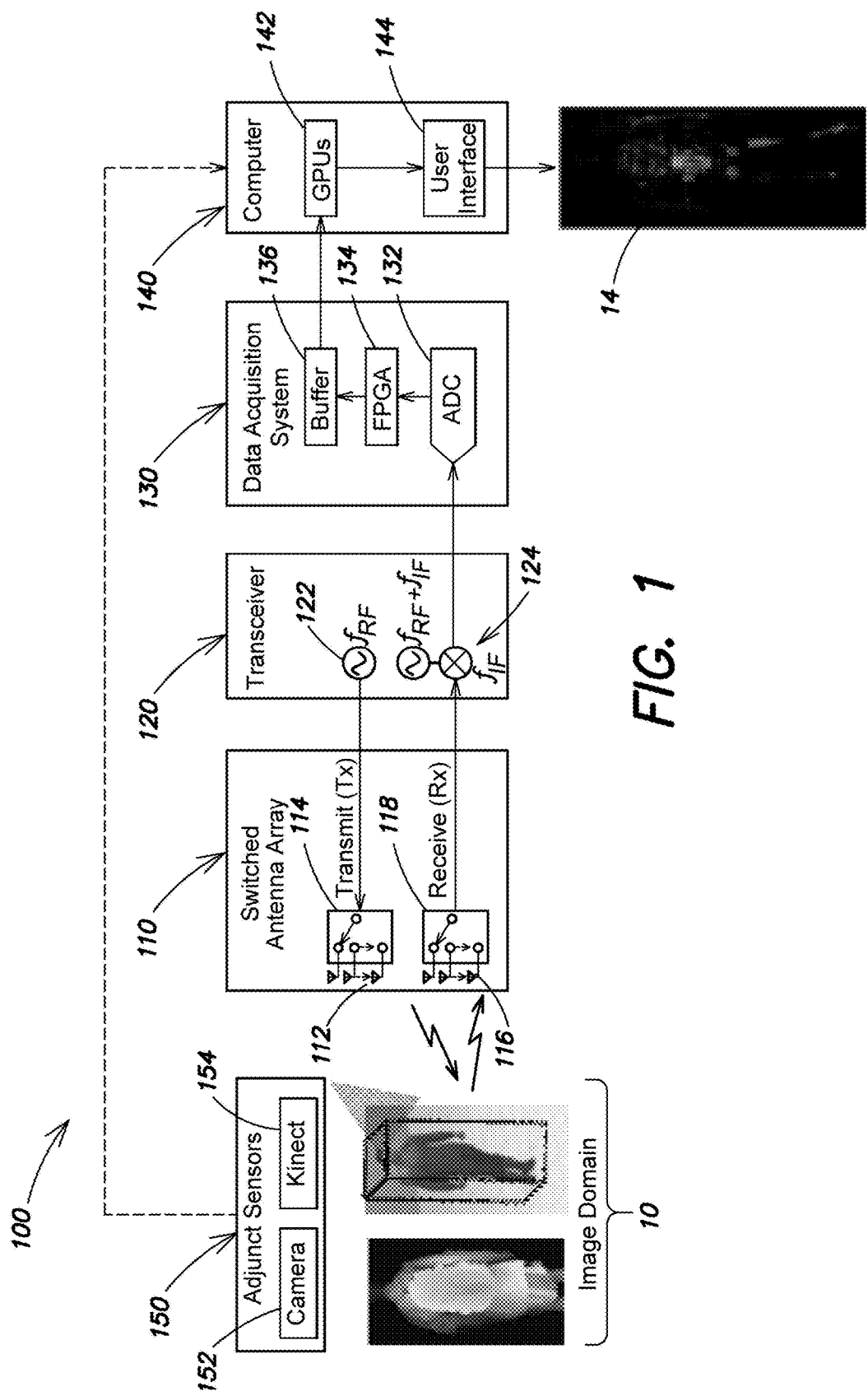
FIG. 1 shows a block diagram of a multistatic imaging system configured to perform FFT-based field imaging at video rates.

FIG. 1 illustrates a microwave imaging system 100 that employs a multistatic switched antenna array 110, transceiver 120, data acquisition system 130 and computer 140. The transceiver 120 provides stimulus to a transmit antenna element 112, and the resultant echo from the scene is captured by a receive antenna element 116. The echo is downconverted to an Intermediate Frequency (IF) by the transceiver 120, then digitized by the data acquisition system 130. To form complex 3D images of the scene 10, many echoes are recorded as the antenna array is switched and the stimulus frequency is varied. The set of radar echoes is then processed with the computer 140, which implements an efficient FFT-based imaging process for generating three-dimensional (3D) microwave images 14 of a scene 10 at video rate. In addition, the microwave imaging system 100 may also include optional adjunct sensors 150, such as a visible or infrared camera 152 or a structured light sensor 154 (e.g., a Microsoft Kinect), for optical imaging and/or active or passive ranging.

The switched antenna array 110 includes a set of switched transmit elements 112 coupled to one or more transmit switches 114 and a corresponding set of switched receive elements 116 coupled to one or more receive switches 118. The switched transmit elements 112 and switched receive elements 116 may be arranged to form one or more sparse arrays, such as a set of tiled Boundary Arrays (BAs), that define a uniform grid of phase centers as described in greater detail below. For example, the array 110 may span an aperture of about 1.5 m×1.5 m (150λ×150λ at 30 GHz), with the switched transmit elements 112 including 1296 transmit elements coupled to a switching matrix and the switched receive elements 116 including 1296 receive elements. Together, the 1296 transmit elements and 1296 receive elements define 82,944 phase centers; other numbers of transmit elements, receive elements, and phase centers are also possible. At the same, the array 110 may have only nine transmit/receive channels, each of which serves 144 transmit elements 112 and 144 receive elements 116.

In one instance, the receive portion of the switched antenna array 110 is implemented with 11 SP4T switches 118, which are used to create a 24-way switch for the receive antenna elements 112. Buried striplines connect the switches 118 and the receive antenna elements 112, reducing the potential for crosstalk with transmit antenna elements 116. Additionally, the receive arrays can use low-noise amplifiers (LNAs) behind the first row of SP4T switches. The transmit arrays may use a similar layout, except that they use a single amplifier at the input of the entire 24-way switch instead of multiple amplifiers. Control of the switches 118 can be accomplished through the use of a suitable processor, such as a Complex Programmable Logic Device (CPLD). The CPLD stores switch biases for the array's 24 switch states, which can be toggled sequentially by sending a pulse to an "Element Step" connector. The state list is reset by pulsing a "Reset" input. This control scheme is simple and independent of acquisition speed.

The switched transmit elements 112 are coupled via the transmit switch(es) 114 to a radio-frequency (RF) synthesizer 122 in the transceiver 120. The RF synthesizer 122 generates a transmit waveform, such as a single tone from 24-30 GHz, which the switched transmit elements 112 emit towards the scene 10 as explained in greater detail below. The switched receive elements 116 receive RF radiation this reflected and/or scattered by objects in the scene. They couple the received RF radiation via the receive switch(es) 118 to a downconverter 124 in the transceiver 120. This downconverter 124 mixes the received RF radiation with a local oscillator (LO) to generate an intermediate frequency (IF) signal (e.g., at around 40 MHz) as well understood in the art of RF electronics. An analog-to-digital converter (ADC) 132 in the data acquisition system 130 digitizes the IF signal, which is converted from the time domain to a single complex-valued point by a field-programmable gate array (FPGA) 134 or other processor, then stored in a buffer 136.

In operation, the system 100 may probe the scene at a particular frequency, capture reflected or scattered returns, and down-convert and digitize the captured returns within a period of about 200 ns or less (i.e., at a rate of 5 MHz or faster). It repeats this acquisition process for each frequency step in the frequency range, possibly capturing an entire frame over all frequency steps. The frame capture time is equal to the product of the period (200 ns in this example), the number of transmit-receive pairs, and the number of frequency steps divided by the product of the number of active transmit antennas and the number of active receive antennas.

A computer 140 or other suitable processing system transforms the data stored in the buffer 136 into a rendering or image 14 of the objects or scene in the imaging domain 10. In some cases, the computer includes one or more graphics processing units (GPUs) 142 that apply a multistatic-to-monostatic correction to the data, then perform image reconstruction using a highly efficient FFT imaging technique described in greater detail below. The computer 140 displays the reconstructed image 14 to a user via a user interface 144, which may include a 2-dimensional (2D), such as a liquid crystal display, or a 3D display, such as a stereoscopic display.

The system 100 may also include one or more optional adjunct sensors 150, such as a visible or infrared camera 152 and a structured light sensor 154 (e.g., a Microsoft Kinect sensor). These adjunct sensors may acquire one or more depth maps of the imaging domain 10 while the system 100 acquires the microwave returns. The computer 140 may fuse data from the adjunct sensors 150 to create a more sophisticated rendering of the scene. It may also use data from the adjunct sensors 150 to create a depth map of the imaging domain 10 for use in constraining or restricting the image domain 10 for FFT-based image processing. Data from the adjunct sensors 150 can also be used by the computer 140 and/or a user to restrict size, shape, and/or position of the imaging domain, potentially reducing the computational load.

Compared to other multistatic microwave imaging systems, the imaging system 100 shown in FIG. 1 (using array sampling and image reconstruction techniques described below) can produce 3D microwave images with a tractable processing load. In some cases, its FFT-based imaging technique is more than two orders of magnitude less computationally demanding than the prevailing backprojection technique. As a result, it can render 3D images at video rates, depending on number of frequency points in the data, the size and spatial resolution of the imaging domain, and the processing power of the GPUs 142.

Supertiles for Multistatic FFT-Based Imaging

Figure 2:
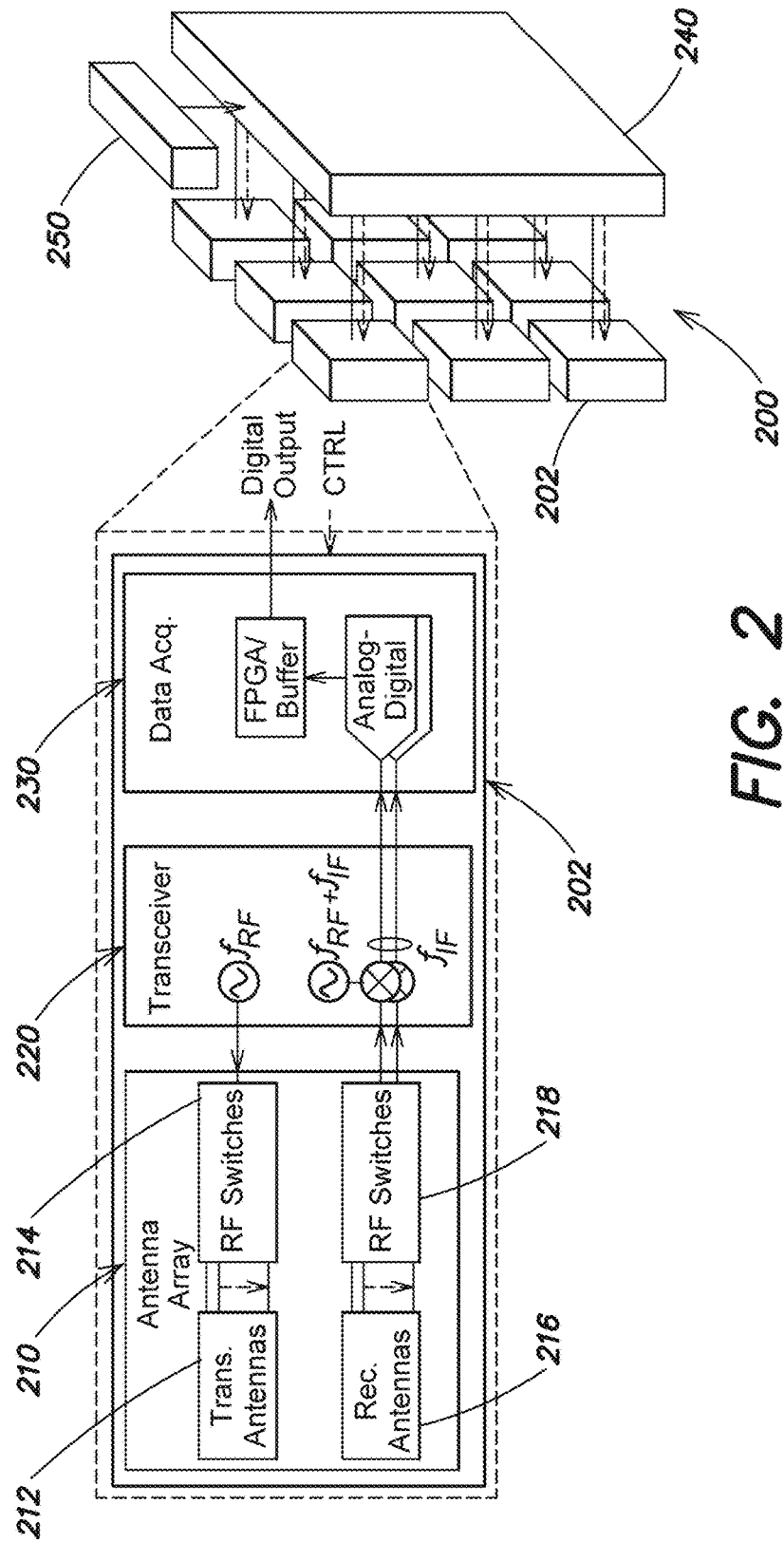
FIG. 2 depicts a practical implementation of a multistatic imaging system with a sparse array formed of "supertiles."

FIG. 2 illustrates a practical implementation 200 of a standoff microwave imaging that incorporates the array design and imaging technique described herein. This system 200 includes a set of "supertiles" 202 arranged in a rectangular array (other shapes are also possible) and operably coupled to a computer/digital interface 240, which may also be coupled to a range-finding camera 250 or other ranging device. Each supertile 202 is a partition of the full aperture, which includes a corresponding switched multistatic antenna array 210, such as a tiled boundary array, with correspond transmit antennas 212, transmit switches 214, receive antennas 216, and receive switches 218. Each supertile 202 also includes a corresponding transceiver 220 and data acquisition block 230.

Together, the antenna array 210, transceiver 220, and data acquisition block 230 in each supertile 202 operate like the antenna array 110, transceiver 120, and data acquisition block 130 described above with respect to FIG. 1 to acquire and digitize microwave or millimeter-wave data. The supertiles 202 can operate without exchanging RF signals, i.e., they can be configured for purely digital input and output. In addition, the supertiles 202 can also operate independently of each other, e.g., by transmitting and receiving orthogonal RF waveforms, such as frequency-multiplexed waveforms. If the supertiles are all of identical construction, this paradigm allows for modular, scalable realization.

The computer/digital interface 240 processes the digitized data by applying a multistatic-to-monostatic correction/compensation, then applying a Fourier-transform beam propagation technique as described above and below. The resulting microwave images are fused, possibly using a depth map generated from visible or infrared images acquired by the camera 250, to generate 3D microwave images. These images may be rendered in real-time at video or near-video rates.

Multistatic Array Topology

Figure 3A:
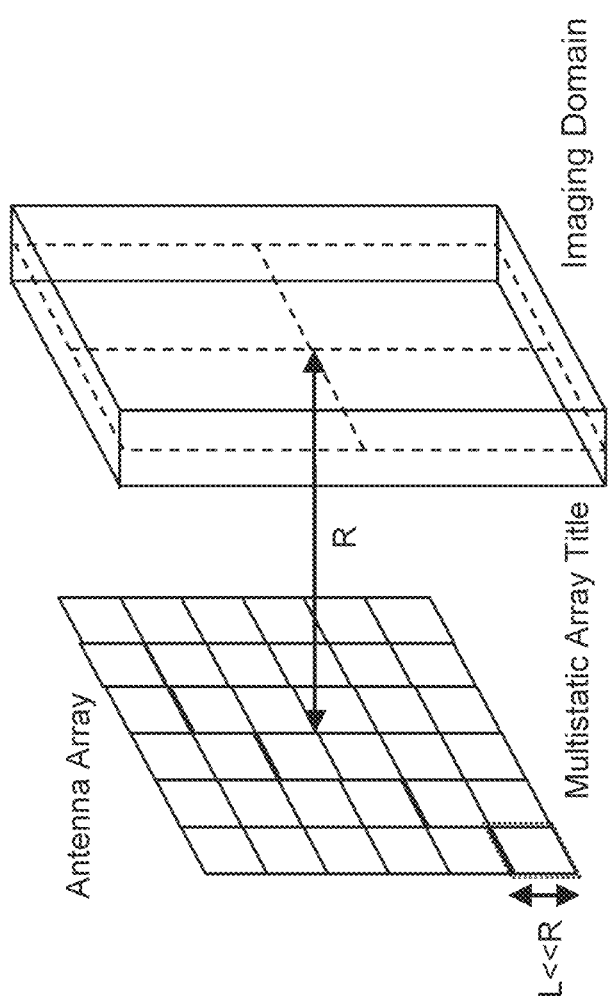

The array topology is notionally depicted in FIG. 3A. As seen, it is a contiguous tessellation of antenna tiles. Each tile is a multistatic antenna array: its transmit and receive antennas are not co-located, and are not separated by a fixed distance. The length of each tile (L) is significantly smaller than the imaging range (R), e.g., L<R/4. As described in below examples, each array tile samples the scene on a regularly spaced grid of phase centers. The effect is that the full aperture samples the scene on a much larger grid of phase centers. It is further noted that phase center sampling takes place only within array tiles, restricting the distance between transmit and receive antenna elements to less than the tile length times square root of 2 ($<\vec{2}L$).

Figure 3C:
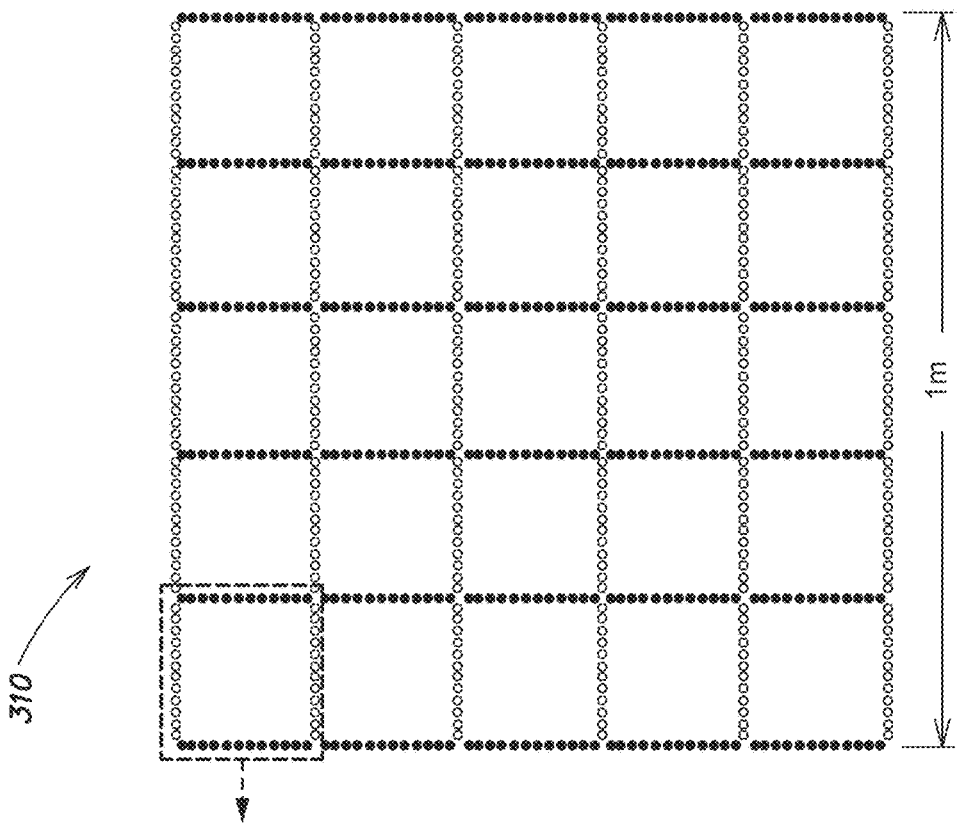
Figure 3B:
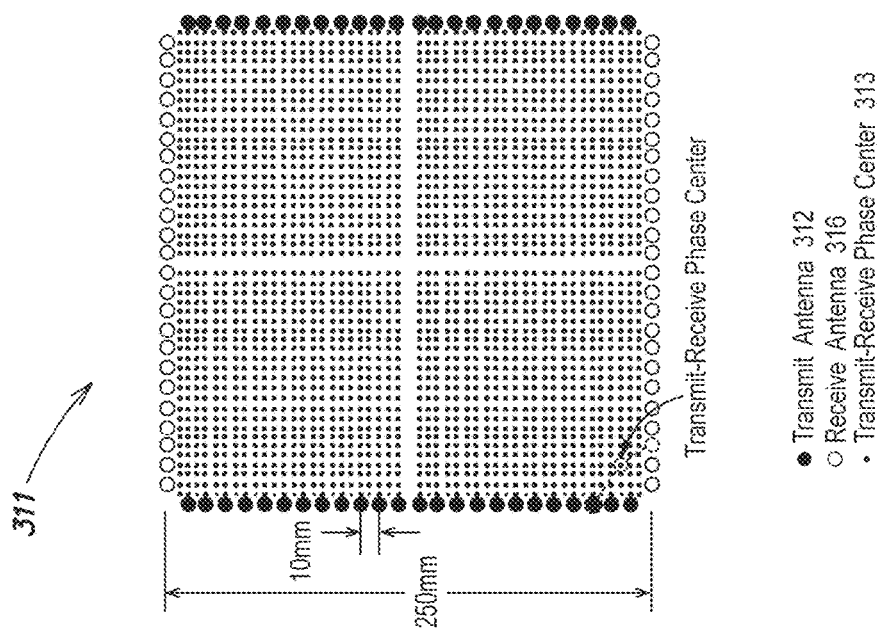

FIGS. 3B and 3C depict an example multistatic array topology compatible with the microwave imaging systems 100 and 200 shown in FIGS. 1 and 2, respectively. As seen, the topology is a tiled arrangement of Boundary Arrays (BAs) 311. Each BA 311 is a multistatic array layout with linear arrays of transmitters 312 on the sides, linear arrays of receivers 316 on the top and bottom, and an open interior. In this case, the transmit arrays 312 are vertically oriented and the receive arrays 316 are horizontally arrayed, but other arrangements are also possible. The BA tiles 311 are arranged so adjacent BAs 311 share a linear transmit array 312 or a linear receive array 316. That is, a pair of BAs 311 arranged side-by-side share a linear transmit array 312, and a pair of BAs 311 arranged top and bottom share a linear receive array 316.

Each BA 311 samples a scene with a regularly spaced grid of non-redundant phase centers 313. Each transmit element/ receive element pair in the BA 311 defines a corresponding phase center 313 at the midpoint of the line segment connecting the transmit element with the receive element. Taken together, all of the transmit element/receive element pairs in a given BA 311 form phase centers 313 arrayed along a grid within the interior of the BA 311 as shown in FIG. 3B. It is noted that the grid is missing a row and column of phase centers in the middle of the tile; however, the effect of this missing row and column on image quality is negligible.

The tiled BA layout samples the scene with a regularly spaced grid of phase centers that covers the extent of the aperture. Phase center sampling takes place only within a tile. In other words, a linear transmit array communicates only with adjacent linear receive arrays. This restricts the distance between transmit-receive antenna pairs.

In the example shown in FIGS. 3B and 3C, the transmit and receive elements are spaced by 10 mm, or 1λ at 30 GHz. The resultant phase center grid, then, is spaced by 0.5λ. This results in sampling that is roughly similar to that produced by a monostatic configuration (e.g., where the scene is sampled with a uniform grid of transmit/receive antennas). However, the tiled BAs 310 include far fewer antenna elements than a monostatic configuration covering the same aperture. In the depicted example, the aperture has 480 transmit antennas and 480 receive antennas, but forms 36864 spatially diverse phase centers.

FIGS. 3D and 3E depict another example multistatic array topology compatible with the microwave imaging systems 100 and 200 shown in FIGS. 1 and 2, respectively. The topology is a tiled arrangement of multistatic array 317. Each tile contains 4 blocks of transmit elements 318 (one at each corner) and a grid of receive elements 319 within its interior. The tiles 317 are arranged so adjacent tiles share blocks of transmit elements 318.

Each tile 317 samples a scene with a regularly spaced grid of equivalent, non-redundant phase centers 320. Each transmit element/receive element pair in the tile 317 defines a corresponding phase center 320 at the midpoint of the line segment connecting the transmit element with the receive element. Taken together, the transmit element/receive element pairs in a given tile 317 form phase centers 320 arrayed along a grid within the interior of the tile 317 as shown in FIG. 3D. It is noted that the grid is missing a row and column of phase centers in the middle of the tile; again, the effect of this missing row and column on image quality is negligible. Thus, the tiled layout samples the scene with a grid of phase centers that covers the extent of the aperture.

It is noted that phase center sampling takes place only within a tile. In other words, a block of transmit antennas communicates only with adjacent blocks of receive antennas. This restricts the distance between transmit-receive antenna pairs.

In the example shown in FIGS. 3D and 3E, the transmit elements are spaced by 10 mm, (1λ at 30 GHz), while the receive elements are spaced by 30 mm (3λ at 30 GHz). The resultant phase center grid, then, is spaced by 0.5λ. This results in sampling that is roughly similar to that produced by a monostatic configuration (e.g., where the scene is sampled with a uniform grid of transmit/receive antennas). However, the tiled arrays 321 include far fewer antenna elements than a monostatic configuration covering the same aperture. In the depicted example, the aperture has 225 transmit antennas and 1024 receive antennas, but forms 36864 spatially diverse phase centers. It is noted that the positions of transmit and receive elements could be swapped in this example, without any effects on performance.

Each multistatic array is coupled to a transceiver 120 as shown in FIG. 1. A transmitter 122 in the transceiver 120 drives the transmit elements 112 via a transmit switch 114 in a time-multiplexed fashion: first one transmit element 112 sends a signal, then another, and so on. Similarly, the receive elements 116 are time-multiplexed with receive switch 118 coupled to a receiver 124 in the transceiver 120 to sample the waves reflected and scattered from the scene. Alternatively, multiple receive elements could record scene reflections at the same time as the transmit elements are switched (resulting in faster acquisition). Further, multiple transmit antennas could be activated simultaneously, using orthogonal waveforms.

Multistatic FFT-Based Imaging

As explained above, multistatic array topologies can be used to drastically reduce the number of antenna elements required in a large imaging aperture, mitigating hardware costs. However, with multistatic sampling schemes, efficient reconstruction remains a challenge. While the very computationally expensive backprojection method can be used for any multistatic scheme, the more efficient FFT method generally cannot be used directly. The imaging technique described in this section allows the FFT-based method to be used, after a data correction is applied. Because this process is relatively computationally inexpensive, it allows for video rate image formation on COTS computing hardware.

Figure 4A:
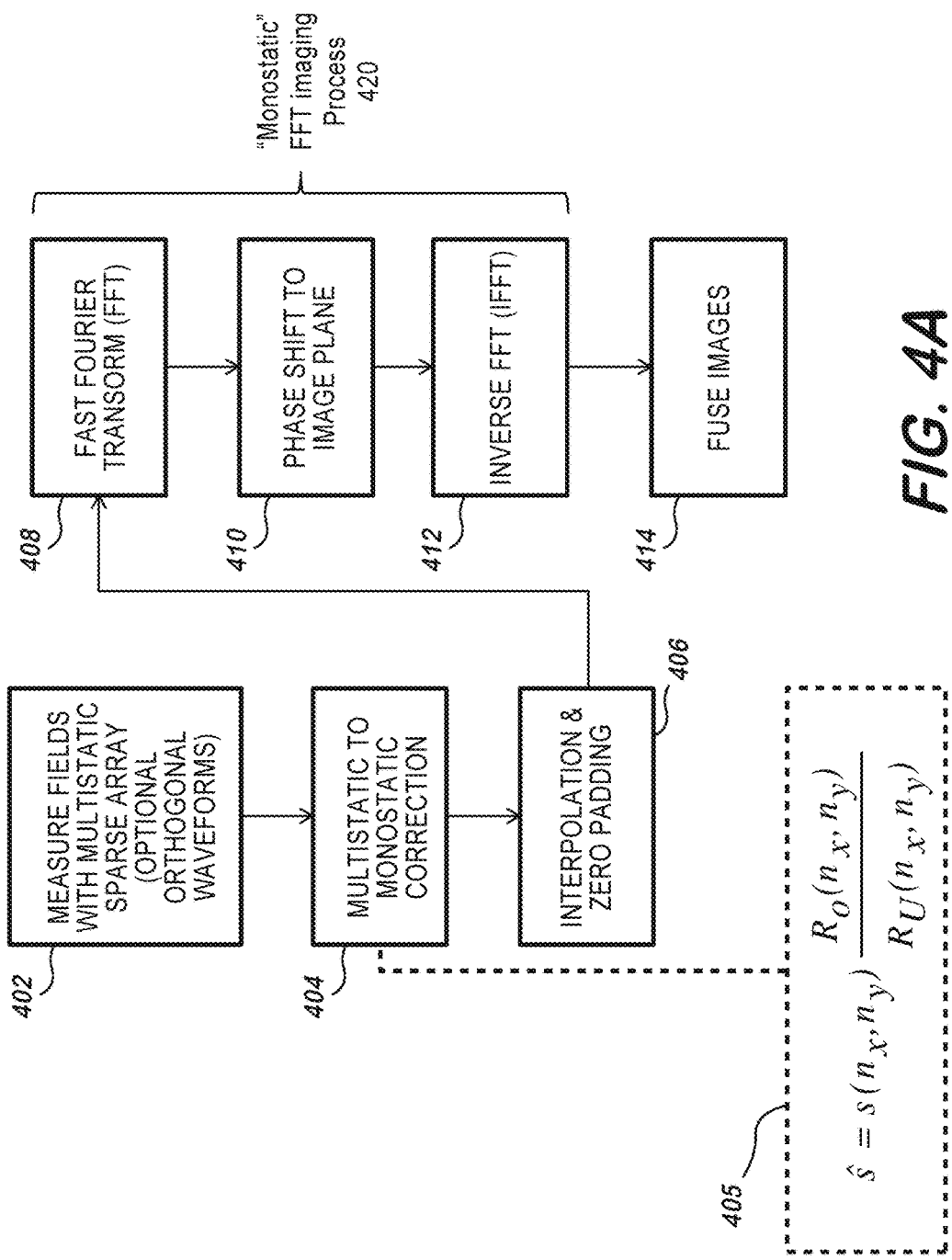
FIG. 4A is a block diagram illustrating a multistatic imaging process.

FIG. 4A depicts an inventive multistatic FFT-based imaging process 400. The process 400 begins with acquiring RF image data (402) with a multistatic array, such as those shown in FIGS. 3A-3E. In some cases, different tiles within the multistatic array may operate simultaneously or in a temporally overlapping fashion by emitting and receiving orthogonal waveforms. As previously described, the multistatic array samples the scene on a regularly spaced grid of phase centers that covers the entire aperture. Each phase center is sampled only once (i.e., the topology samples without redundancy).

For each frequency point, reflection data is formatted into a 2D matrix, $s(n_x, n_y)$, where indices $n_x$ and $n_y$ correspond to x- and y-positions of phase centers. Reflections for the missing phase centers in the middle row and column of each array tile are set to zero. Next, the sampled data set undergoes a multistatic-to-monostatic correction (404) using correction factor 405 A reference point is defined in the center of the imaging domain at a position given by $\vec{r}_{ref}$. The corrected data set is given by:

$$\hat{s}(n_x, n_y) = s(n_x, n_y) \frac{R_o(n_x, n_y)}{R_u(n_x, n_y)}. \tag{3}$$

$R_u(n_x, n_y)$ is the calculated reflection set that the multistatic design would receive if it probed a scene that contained only a point scatterer placed at $\vec{r}_{ref}$:

$$R_u(n_x, n_y) = e^{-jk|\vec{r}_T(n_x, n_y) - \vec{r}_{ref}|} e^{-jk|\vec{r}_{ref} - \vec{r}_R(n_x, n_y)|}. \tag{4}$$

It is noted that $\vec{r}_T$ is the position of transmit antennas, while $\vec{r}_R$ is the position of receive antennas. $R_o(m, n)$ is the calculated reflection set that would be received by a monostatic aperture imaging the point scatterer scene, where sampling takes place on the multistatic aperture's phase center grid, $\vec{r}_c$:

$$R_0(n_x, n_y) = e^{-j2k|\vec{r_c}(n_x, n_y) - \vec{r}_{ref}|}. \quad (5)$$

The corrected data is then zero padded and interpolated (406) to size $2^N$ for FFT processing, where N is a power of 2. (The data may also be interpolated before the multistatic-to-monostatic correction is applied.) For instance, an aperture that supports 300×300 phase centers would be padded to size 512×512. The zero padded data undergoes an FFT (408), a phase shift to the image plane (410), and an inverse FFT (412) as part of the "monostatic" Fourier imaging process 420. This "monostatic" imaging process 420 is repeated for each measured frequency, and images are fused or summed (414) over frequency at each depth slice in a 3D imaging domain to produce an output image.

Deriving the Multistatic-to-Monostatic Corrections

Figure 4B:
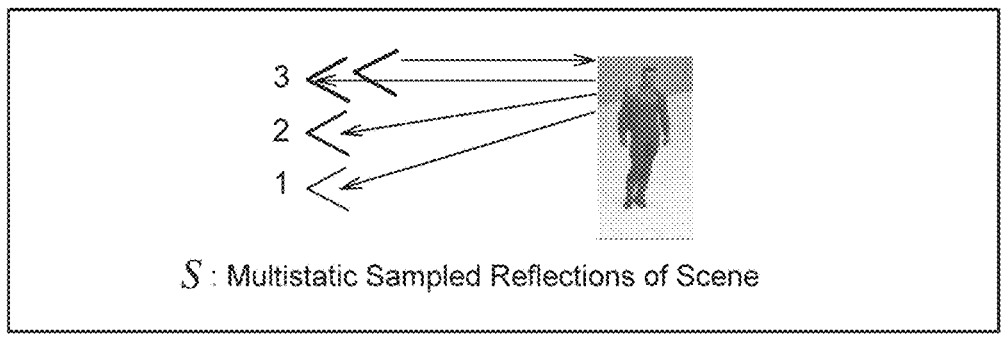
FIG. 4B illustrates the multistatic-to-monostatic correction in the process of FIG. 4A
Figure 4B:
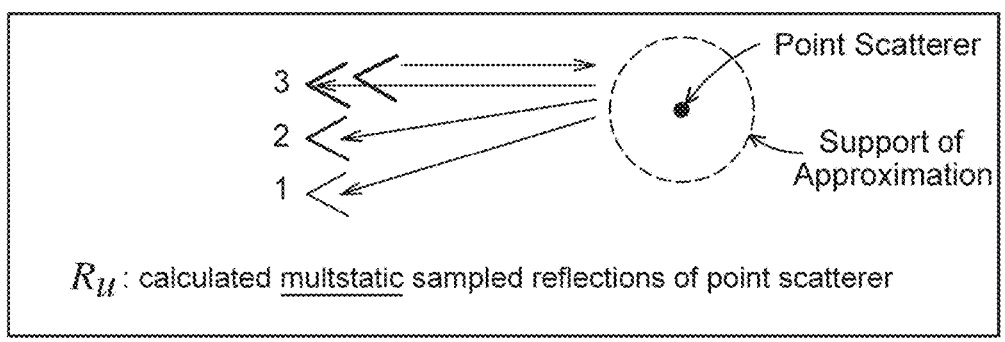
Figure 4B:
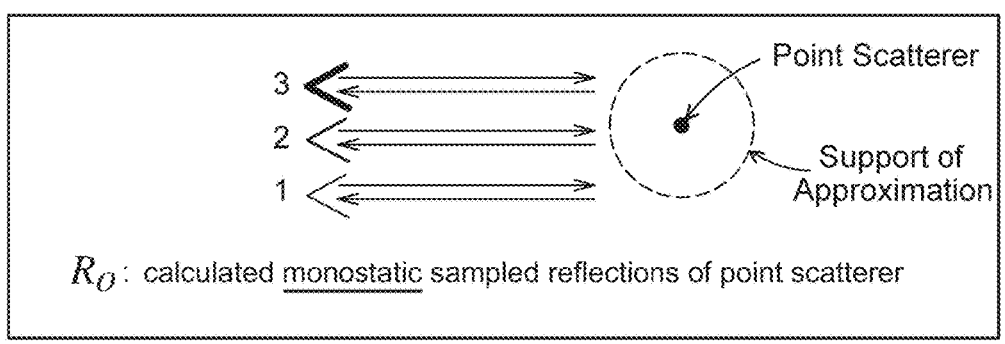

FIG. 4B illustrates derivation of the multistatic-to-monostatic correction applied in step 404 of the multistatic FFT-based imaging process 400 of FIG. 4A. As shown at the top of FIG. 4B, in a multistatic arrangement (shown here with receive elements 1-3), each receive element samples radiation that is emitted by a single transmit element and scattered and/or reflected by objects in the scene (e.g., a person wearing a backpack). This detected radiation is represented as the measured fields $s_{Measured}$.

The middle panel of FIG. 4B shows how elements 1-3 would detect radiation scattered off a point scatterer located roughly in the center of the imaging domain when operating as receive elements in a multistatic array. These calculated multistatic sampled reflections are expressed as $R_u$. Conversely, the bottom panel of FIG. 4B shows how elements 1-3 would detect radiation scattered off a point scatterer located roughly in the center of the imaging domain (e.g., in the center of a rectangular prism shaped domain) when operating as independent monostatic elements. These calculated monostatic sampled reflections are expressed as $R_o$. Multiplying the measured fields s by the ratio of the calculated monostatic sampled reflections $R_o$ to the calculated multistatic sampled reflections $R_u$ yields the multistatic-to-monostatic correction factor 405 applied in the multistatic FFT-based imaging process 400 shown in FIG. 4A.

The multistatic to monostatic correction is valid over a finite imaging domain. However, as illustrated by experimental results given below, a single correction is sufficient for a human-sized domain. The correction may become less accurate as the size of the BA tiles is increased. Larger imaging domains could be realized by decomposition into subdomains.

Comparison with Backprojection Techniques

For real time imaging capability, image reconstruction should occur at or near video rates. Fortunately, the FFT-based techniques disclosed herein provide a reconstruction that can be performed orders of magnitude faster than backprojection using readily available, suitably programmed computer hardware (e.g., GPUs). In some cases, FFT-based construction can be performed at video rate using COTS computing hardware.

Figure 4C:
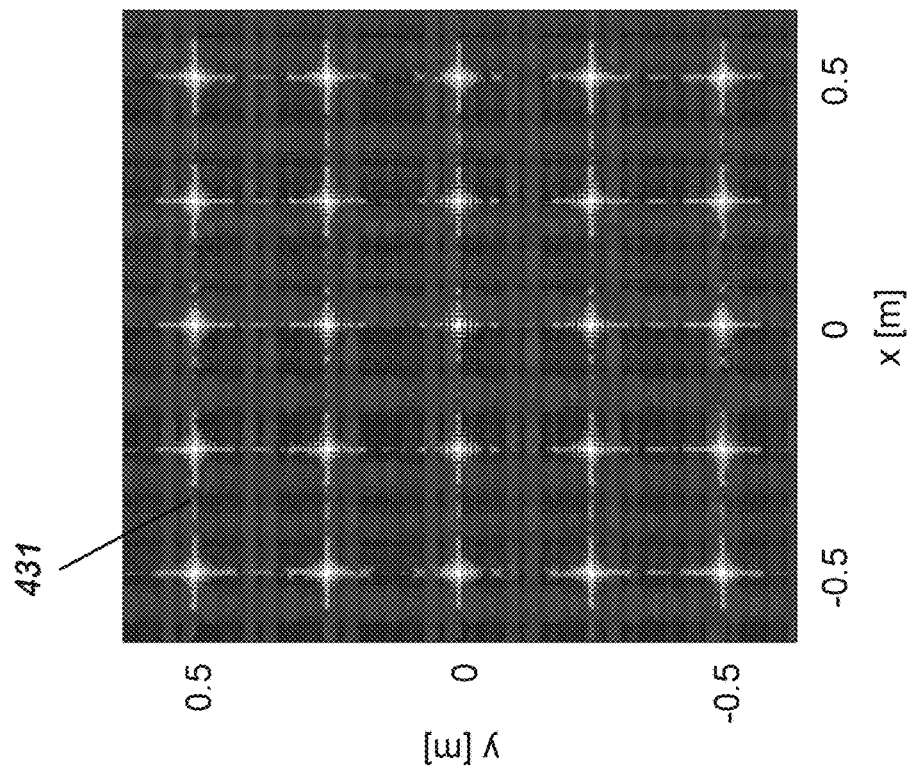
FIG. 4C depicts a simulated image of 25 point scatterers, rendered with multistatic FFT imaging (430) and backprojection (431).
Figure 4C:
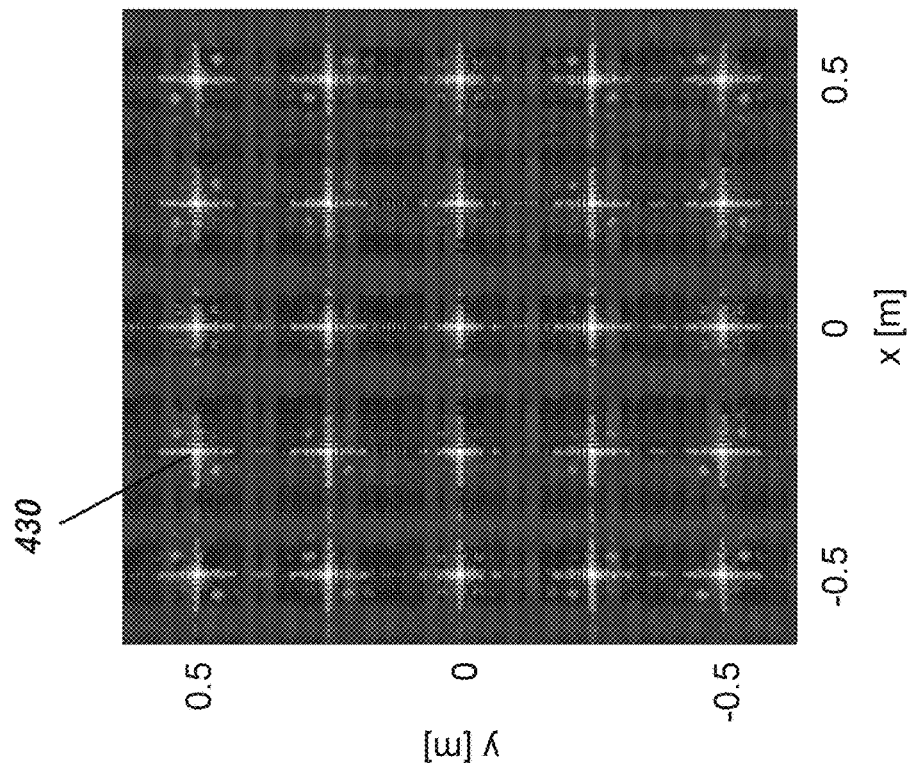

To compare the presented method with the prevailing backprojection technique, a simulation is considered where the array depicted in FIG. 3C is used to image a set of 25 point scatterers arranged in a grid. FIG. 4C depicts resultant images where FFT imaging was used (430) and where backprojection was used (431). For computation via backprojection, the image at each pixel was given by:

$$I(\vec{r_v}) = \sum_{n_x} \sum_{n_y} s(n_x, n_y) e^{jk|\vec{r_v} - \vec{r_T}(n_x, n_y)|} e^{jk|\vec{r_R}(n_x, n_y) - \vec{r_v}|}.$$

It is noted that $\vec{r}_T$ is the position of transmit antennas, while $\vec{r}_R$ is the position of receive antennas.

The simulation assumed a stimulus ranging from 24-30 GHz (32 steps), and presented images have a dynamic range of 40 dB. As seen, the images are nearly identical. However, an analysis of the computational workloads required for each case shows that formation of the image with the FFT method requires 0.57 GFLOP (Giga-Floating Point Operations), while backprojection requires 512 GFLOP. The computational workload values used to calculate the computational loads are from M. Arakawa, "Computational Workloads for Commonly Used Signal Processing Kernels, ser." Project Report, MIT Lincoln Laboratory, 2006, which is incorporated herein by reference in its entirety.

Figure 4D:
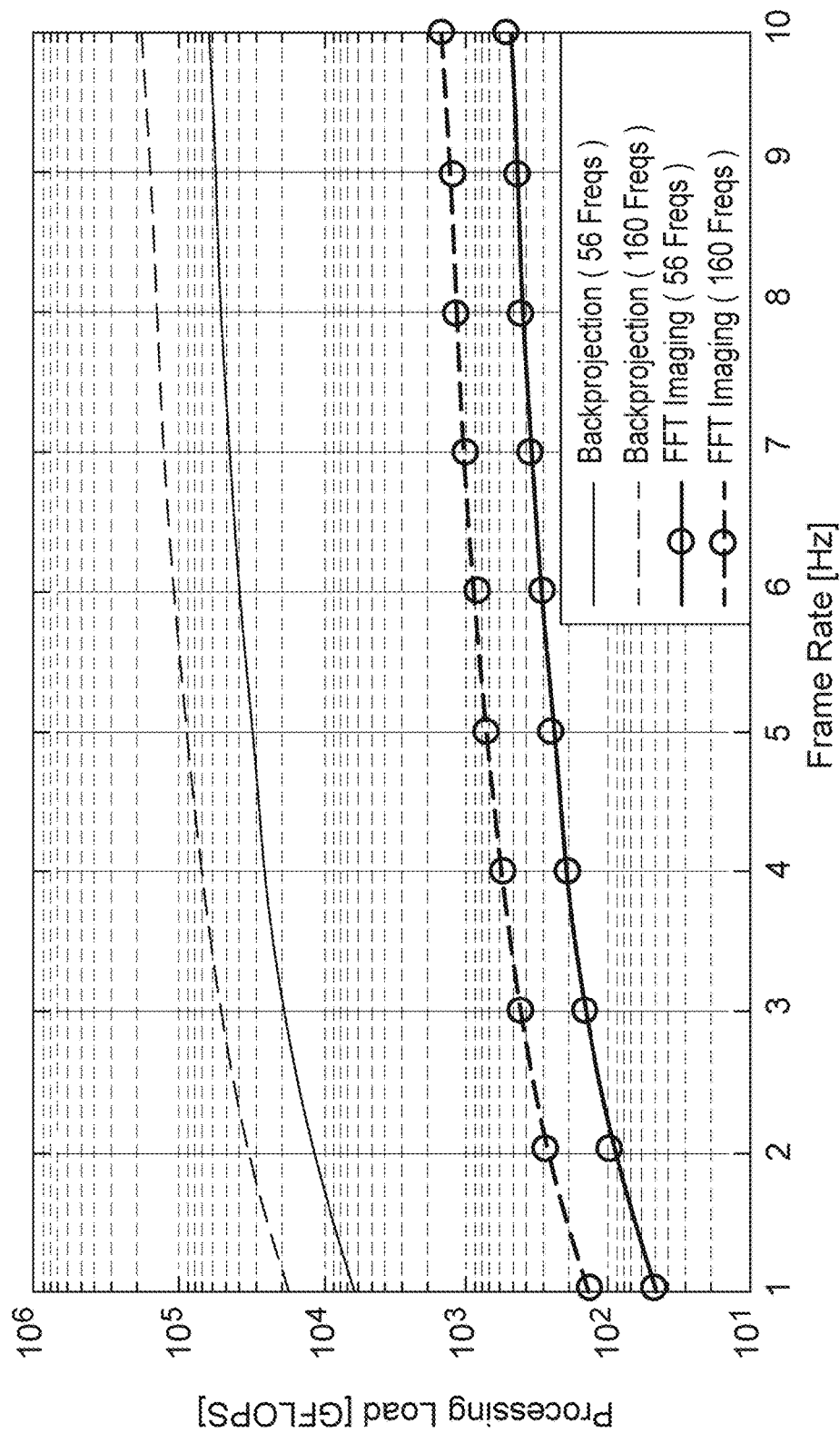
FIG. 4D is a plot of processing load versus frame rate for FFT-based imaging (lower traces) and backprojection (upper traces) for imaging with 56 frequency bins (solid lines) and 160 frequency bins (dashed lines).

FIG. 4D is plot of processing load versus frame rate for FFT imaging and backprojection with 56 and 160 frequency steps. In this analysis, the array is a 5×5 tile array like those shown in FIGS. 3B and 3C and the imaging domain has 21 depth planes. FFT imaging is about two orders of magnitude faster than backprojection for both 56 and 160 frequency steps over frame rates ranging from 1-10 Hz.

Experimental Validation of Multistatic FFT-Based Imaging

Figure 5:
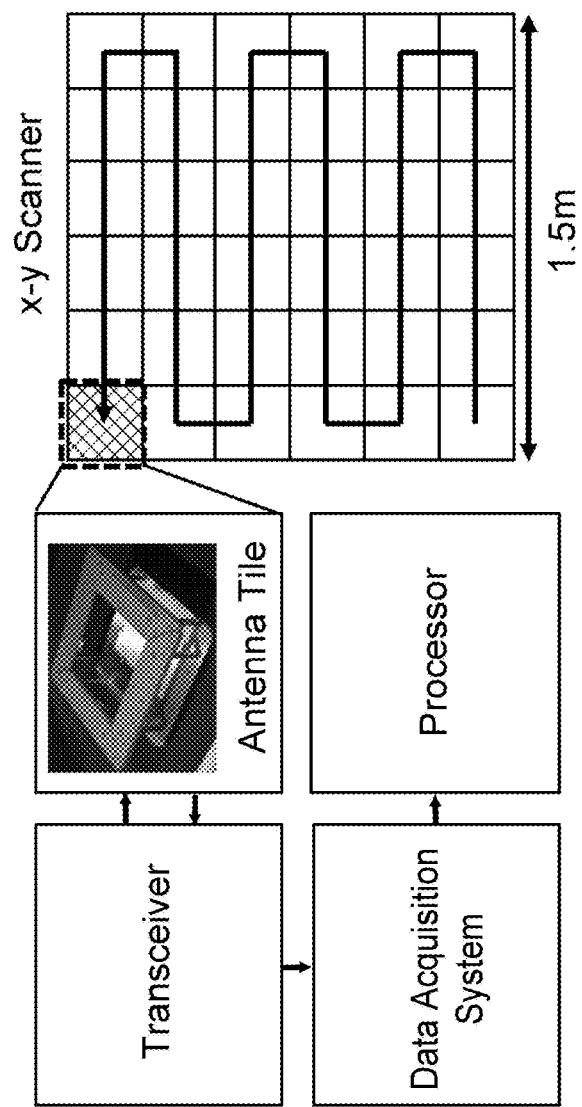
FIG. 5 shows an experimental setup where a single array tile is used to measure a scene at a grid of different positions to emulate a 1.5 m array.

FIG. 5 depicts an experimental setup to validate the presented technique. The setup contains a single switched multistatic array tile, transceiver, data acquisition system and processor. The 0.25 m array tile is placed on an x-y scanner and moved to a 6×6 grid of positions. At each position, the system samples the scene with the grid of phase centers supported by the array tile. Data from these positions are processed to form an image that would be obtained with a 1.5 m tiled array.

Figure 6B:
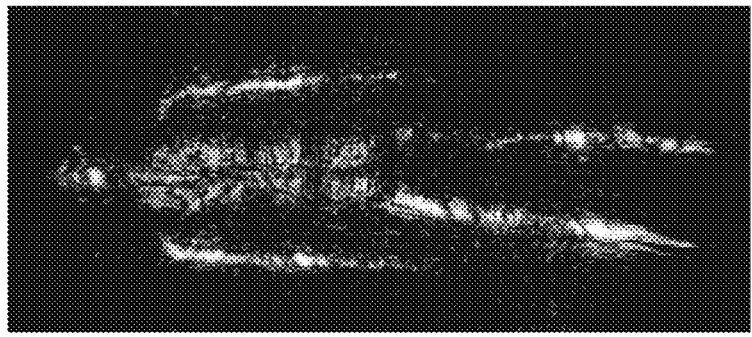
FIGS. 6A and 6B show images acquired with the setup depicted in FIG. 5 and reconstructed with the process illustrated in FIG. 4A.
Figure 6A:
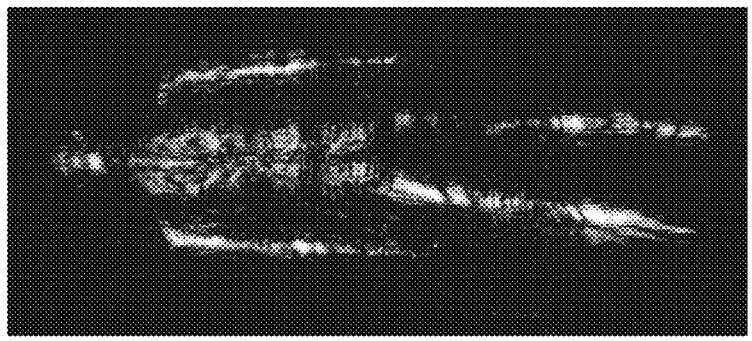

FIGS. 6A and 6B, show images reconstructed from data acquired with the setup of FIG. 5A. A COTS computer with four Nvidia GeForce Titan X Graphics Processing Units (GPUs) was used to reconstruct the images using the FFT techniques disclosed herein. The scene (rear view of a clothed human phantom) is clearly reconstructed.

FIG. 6A was formed with 24-28 GHz stimulus, using 160 frequency points while FIG. 6B was formed at 24-26.8 GHz stimulus using 56 frequency steps. In both imaging scenarios the 3D images were realized with 21 depth slices, spaced by 0.015 m. For the imaging scenario presented in FIG. 6A (512×512 FFT size, 160 frequency points, and 21 depth slices), the computation time was observed as 0.101 seconds. For the 56-frequency point case depicted in FIG. 6B, the computation time was observed as 0.048 seconds. These results illustrate that real time image reconstruction of a human-sized domain is possible using the presented technique, with COTS computing hardware.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of near-field microwave imaging of a scene, the method comprising:
acquiring multistatic array data with a multistatic array;
applying a multistatic-to-monostatic correction to the multistatic array data to form corrected multistatic array data;
Fourier transforming the corrected multistatic array data to form Fourier-domain data;
applying a phase shift to the Fourier-domain data to form phase-shifted Fourier-domain data, the phase shift corresponding to a distance between the multistatic array and the scene; and
inverse Fourier transforming the phase-shifted Fourier-domain data to form a representation of the scene,
wherein applying the multistatic-to-monostatic correction comprises:
estimating multistatic reflections of a point scatterer as sampled by the multistatic array;
estimating monostatic reflections of the point scatterer as sampled in a plane of the multistatic array; and
weighting the multistatic array data by a ratio of the monostatic reflections of the point scatterer to the multistatic reflections of the point scatterer.

2. The method of claim 1, wherein the multistatic array comprises a plurality of tiled multistatic arrays and wherein acquiring the multistatic array data comprises sampling each transmitter-receiver pair in each tiled multistatic array in the plurality of tiled multistatic arrays.

3. The method of claim 2, further comprising:
acquiring a first portion of the multistatic array data with a first tiled multistatic array in the plurality of tile multistatic arrays with a first waveform; and
acquiring a second portion of the multistatic array data with a second tiled multistatic array in the plurality of tile multistatic arrays with a second waveform orthogonal to the first waveform.

4. The method of claim 2, wherein sampling each transmitter-receiver pair in each tiled multistatic array comprises sampling only each transmitter-receiver pair in each tiled multistatic array in the plurality of tiled multistatic arrays.

5. The method of claim 1, wherein acquiring the multistatic array data further comprises sampling a grid of phase centers defined by a plurality of transmitter-receiver pairs in the multistatic array.

6. The method of claim 5, wherein the grid of phase centers is a nonredundant, regularly spaced grid of equivalent phase centers.

7. The method of claim 1, wherein the point scatterer is at an approximate center of the scene.

8. A method of near-field microwave imaging of a scene, the method comprising:
acquiring multistatic array data with a multistatic array;
applying a multistatic-to-monostatic correction to the multistatic array data to form corrected multistatic array data;
Fourier transforming the corrected multistatic array data to form Fourier-domain data;
applying a phase shift to the Fourier-domain data to form phase-shifted Fourier-domain data, the phase shift corresponding to a distance between the multistatic array and the scene; and
inverse Fourier transforming the phase-shifted Fourier-domain data to form a representation of the scene,
wherein acquiring the multistatic array data, applying the multistatic-to-monostatic correction, Fourier transforming the corrected multistatic array data, applying the phase shift to the Fourier-domain data, and inverse Fourier transforming the phase-shifted Fourier-domain data occurs at a rate of at least about 10 Hz.

9. The method of claim 1, further comprising:
interpolating the corrected multistatic image data onto a uniform grid before Fourier transforming the corrected multistatic array data to form the Fourier-domain multistatic array data.

10. A system for imaging a scene, the system comprising:
a multistatic array to acquire multistatic array data representing the scene; and
a transceiver, operably coupled to the multistatic array, to transduce the multistatic array data; and
a processor, operably coupled to the transceiver, to:
apply a multistatic-to-monostatic correction to the multistatic array data to form corrected multistatic array data;
Fourier transform the corrected multistatic array data to form Fourier-domain data;
apply a phase shift to the Fourier-domain data to form phase-shifted Fourier-domain data, the phase shift corresponding to a distance between the multistatic array and the scene; and
inverse Fourier transform the phase-shifted Fourier-domain data to form a representation of the scene,
wherein the processor is configured to apply the multistatic-to-monostatic correction by:
estimating multistatic sampled reflections of a point scatterer;
estimating monostatic sampled reflections of the point scatterer; and
weighting the multistatic array data by a ratio of the monostatic sampled reflections of the point scatterer to the multistatic sampled reflections of the point scatterer.

11. The system of claim 10, wherein the multistatic array comprises a plurality of tiled multistatic arrays.

12. The system of claim 11, wherein each tiled multistatic array in the plurality of tiled multistatic arrays comprises a linear transmit array configured to communicate only with adjacent linear receive arrays.

13. The system of claim 11, wherein the plurality of tile multistatic arrays comprises:
a first tiled multistatic array configured to emit and receive a first waveform; and
a second tiled multistatic array configured to emit and receive a second waveform orthogonal to the first waveform.

14. The system of claim 10, wherein the multistatic array comprises a plurality of transmitter-receiver pairs defining a nonredundant, uniform grid of equivalent phase centers.

15. The system of claim 10, wherein the point scatterer is at an approximate center of the scene.

16. The system of claim 10, wherein the processor is configured to interpolate the multistatic array data onto a uniform grid before Fourier transforming the multistatic array data to form the Fourier-domain multistatic array data.

17. A system for imaging a scene, the system comprising:
a multistatic array to acquire multistatic array data representing the scene; and
a transceiver, operably coupled to the multistatic array, to transduce the multistatic array data; and
a processor, operably coupled to the transceiver, to:
apply a multistatic-to-monostatic correction to the multistatic array data to form corrected multistatic array data;
Fourier transform the corrected multistatic array data to form Fourier-domain data;
apply a phase shift to the Fourier-domain data to form phase-shifted Fourier-domain data, the phase shift corresponding to a distance between the multistatic array and the scene; and
inverse Fourier transform the phase-shifted Fourier-domain data to form a representation of the scene,
wherein the processor is configured to apply the multistatic-to-monostatic correction, Fourier transform the corrected multistatic array data, apply the phase shift to the Fourier-domain data, and inverse Fourier transform the phase-shifted Fourier-domain data at a rate of at least about 10 Hz.

18. The system of claim 10, wherein the processor is configured to Fourier transform the corrected multistatic array data by performing a Fast Fourier Transform (FFT) and to inverse Fourier transform the phase-shifted Fourier-domain data by performing an inverse Fast Fourier Transform (FFT).

19. The system of claim 10, further comprising:
a rangefinder, operably coupled to the processor, to create a depth map of the scene, and
wherein the processor is configured to restrict a size, shape, and/or position of the scene based on the depth map to reduce a computational load on the processor.

20. A system for imaging a scene, the system comprising:
a multistatic array to acquire multistatic array data representing the scene; and
a transceiver, operably coupled to the multistatic array, to transduce the multistatic array data; and
a processor, operably coupled to the transceiver, to:
apply a multistatic-to-monostatic correction to the multistatic array data to form corrected multistatic array data;
Fourier transform the corrected multistatic array data to form Fourier-domain data;
apply a phase shift to the Fourier-domain data to form phase-shifted Fourier-domain data, the phase shift corresponding to a distance between the multistatic array and the scene; and
inverse Fourier transform the phase-shifted Fourier-domain data to form a representation of the scene,
wherein the multistatic array comprises a plurality of tiled multistatic arrays, and
wherein each tiled multistatic array in the plurality of tiled multistatic arrays has a length $L<R/4$ given an imaging range R.

21. The method of claim 1, wherein Fourier transforming the corrected multistatic array data to form Fourier-domain data comprises performing a Fast Fourier Transform (FFT) and inverse Fourier transforming the phase-shifted Fourier-domain data comprises performing an inverse Fast Fourier Transform (FFT).

22. The method of claim 1, further comprising:
creating a depth map of the scene with a rangefinder; and
restricting a size, shape, and/or position of the scene based on the depth map to reduce a computational load on the processor.

23. A method of near-field microwave imaging of a scene, the method comprising:
acquiring multistatic array data with a multistatic array;
applying a multistatic-to-monostatic correction to the multistatic array data to form corrected multistatic array data;
Fourier transforming the corrected multistatic array data to form Fourier-domain data;

applying a phase shift to the Fourier-domain data to form phase-shifted Fourier-domain data, the phase shift corresponding to a distance between the multistatic array and the scene; and inverse Fourier transforming the phase-shifted Fourier-domain data to form a representation of the scene, wherein the multistatic array comprises a plurality of tiled multistatic arrays, wherein acquiring the multistatic array data comprises sampling each transmitter-receiver pair in each tiled multistatic array in the plurality of tiled multistatic arrays, and wherein each tiled multistatic array in the plurality of tiled multistatic arrays has a length L<R/4 given an imaging range R.

* * * * *